Patented Aug. 24, 1943

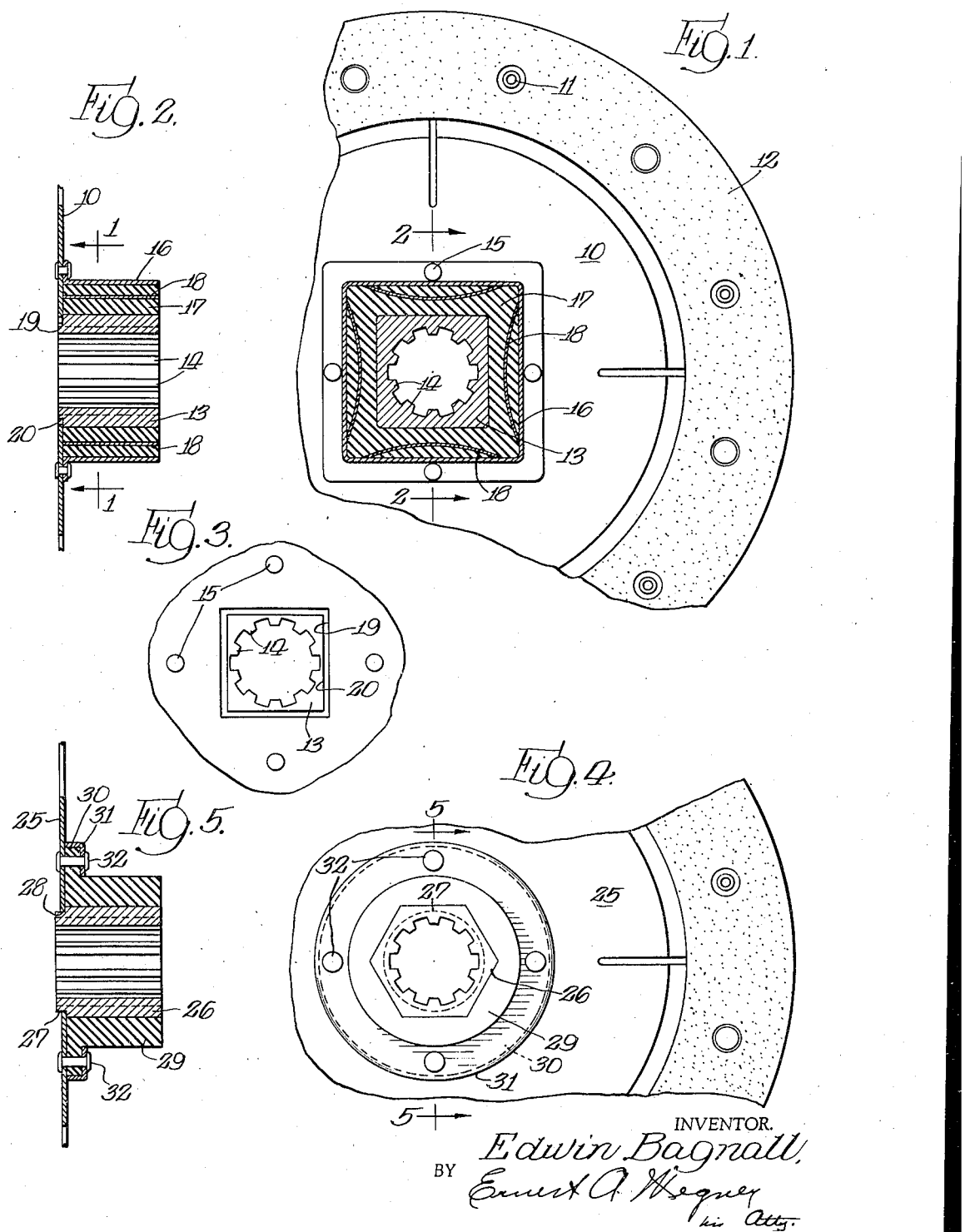

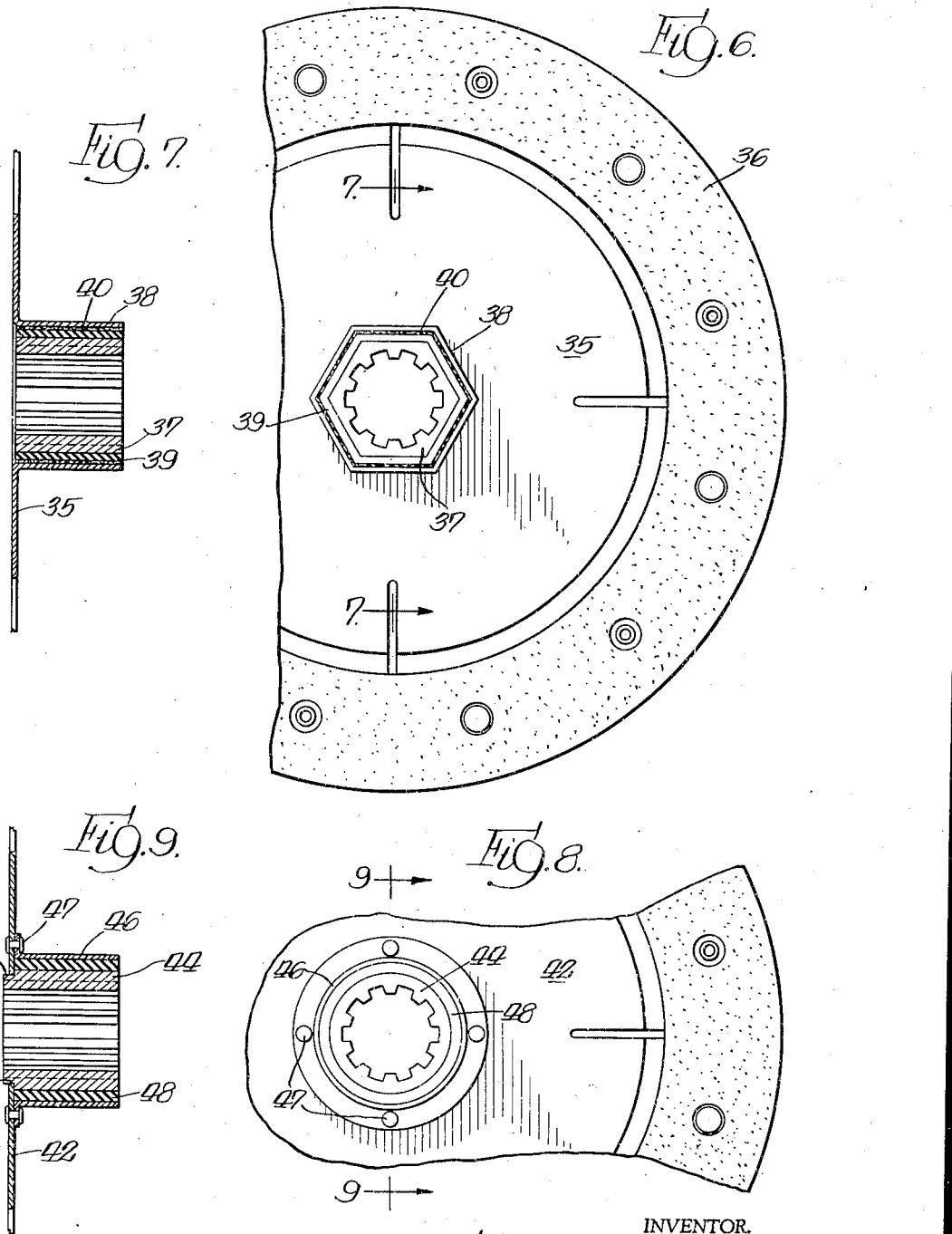

2,327,389

UNITED STATES PATENT OFFICE 2,327,389

CLUTCH ELEMENT

Edwin Bagnall, Chicago, Ill.

Application May 31, 1940, Serial No. 338,109

3 Claims. (Cl. 192—68)

The invention relates generally to a clutch, and more particularly to the construction of a plate or element thereof.

A general object of the invention is to provide a new and improved clutch element, and particularly one that may be manufactured more economically than present day clutch elements using springs or like means.

Another and more particular object of the invention is to provide a clutch element which is unusually smooth in engagement and free of chattering.

Still another object is to provide a clutch element free of parts that might become loosened, resulting in noisy or improper operation, or even loss of those parts.

A further object is to provide a clutch element having a rubber composition driving connection between the hub or sleeve and the remainder of the clutch element.

Other objects and advantages will become apparent from the following detailed description taken in connection with the accompanying drawings, in which:

Fig. 1 is a fragmentary view partially in elevation and partially in section along the line 1—1 of Fig. 2 of a clutch element embodying the features of this invention.

Fig. 2 is a fragmentary sectional view taken along the line 2—2 of Fig. 1.

Fig. 3 is a fragmentary elevational view taken from the left in Fig. 2.

Fig. 4 is a fragmentary axial elevational view of a modified form of clutch element.

Fig. 5 is a fragmentary sectional view taken along the line 5—5 of Fig. 4.

Fig. 6 is a fragmentary axial elevational view of still another modified form of clutch element.

Fig. 7 is a fragmentary sectional view taken approximately along the line 7—7 of Fig. 6.

Fig. 8 is a fragmentary axial elevational view of yet another modified form of clutch element.

Fig. 9 is a fragmentary sectional view taken approximately along the line 9—9 of Fig. 8.

While the invention is here shown and will hereinafter be described in a preferred embodiment and several modifications, it is not intended that the invention is to be limited thereby to the specific constructions disclosed. On the contrary it is intended to cover all modifications and alternative constructions falling within the spirit and scope of the invention as defined by the appended claims.

Turning first to a consideration of the preferred form of the invention shown in Figs. 1 to 3, the clutch element as there shown comprises a metal disk or plate 10 having secured as by rivets 11 to its outer periphery an annular ring 12 of some suitable friction material which provides the driving engagement with complementary elements of the clutch. Disposed centrally of the plate 10 is a sleeve or hub 13 which is formed internally with splines 14, so that it may have an axially slidable but non-rotatable engagement with one of the shafts which are to be coupled by the clutch. Externally the sleeve 13 has a square cross section, as best seen in Fig. 1.

Herein the sleeve 13 is coupled with the plate 10 in a unique manner which not only permits of economical manufacture of the clutch plate and elimination of parts that might otherwise become loosened and lost, but also has a certain yieldability and resiliency which results in smooth and chatter-free engagement of the clutch element. To that end, there is secured to the plate 10, as by means of rivets 15, a housing 16 which also is square in transverse cross section. This housing is made substantially larger than the sleeve 13, but, in order that the plate 10 may be driven by the sleeve 13 through the housing 16, the annular space between the housing and the sleeve is filled with rubber 17 under high compression, resulting in a yieldable, resilient and cushioned driving connection between the sleeve and the housing in which there is no metal to metal contact that may wear or make the noise of metal to metal contact.

With the rubber 17 forced into the annular space between the housing and the sleeve under high pressure, and particularly with the sleeve externally being square, there is no danger that the rubber 17 will yield so much as to permit turning of the sleeve with respect thereto. However, in order to stiffen the rubber 17, there is embedded directly in the rubber, along each wall, a spring 18 which is in the form of a single leaf, flexed to bow inwardly, as viewed in Fig. 1, and projecting from the rubber 17 at its ends to bear against a wall of the housing 16 near but short of the corners thereof. This spring strip, as best seen in Fig. 2, has a width equal to the axial length of the housing so as to extend throughout the entire axial length of the rubber 17. This use of springs 18 embedded in the rubber 17 tends not only to stiffen the rubber somewhat, but gives the effect of a spring mounting or suspension for the sleeve 13.

As a precaution against possible excess rotation of the sleeve 13 relative to the housing 16 and the clutch element 10, a metal to metal limit stop is provided to come into play after a predetermined relative rotation between the sleeve and the housing 16. To that end, as best seen in Fig. 3, the plate 19 is formed at its center with an aperture 19 which is square and slightly larger than the reduced neck portion 20 formed on the end of the sleeve 13 and received in the aperture 19. With the aperture 19 slightly larger than the neck 20 of the sleeve, limited movement of the sleeve relative to the plate is permitted. However, any relative rotation beyond a predetermined amount will result in the corners of the sleeve 13 striking edges of the aperture 19 formed in the plate, and by such contact will thus result in a permanent, unyielding stop which will prevent excessive relative rotation between the sleeve and the housing.

It is to be noted also that the dimensions of the hub 13 and the housing 16 are such that, even without any rubber interposed therebetween, the corners of the hub 13 would strike the springs 18 before the hub had rotated 45° relative to the housing. With the rubber being compressed between the corners of the hub 13 and the springs 18 backed by the housing 16, a positive limit of relative rotation substantially short of the 45° mentioned is thus provided. Thus, after slight relative rotation between the hub and the housing, particularly in the square type of construction here shown or in any other construction providing corners, the rubber compressed between the corners and the housing tends to carry the load, relieving the strain placed upon the pure gripping action of the rubber, and thus tends to prevent permanent displacement of the hub relative to the rubber packing and to the housing 16.

Turning now to a consideration of the form of clutch element shown in Figs. 4 and 5, there is there shown a disk-like plate 25, generally similar to the plate 19 of the preferred form. Again mounted centrally of the plate is a sleeve 26 adapted to have an axially slidable but non-rotatable engagement with one of the shafts to be coupled by the clutch. As best seen in Fig. 4, the sleeve 26 is given a hexagonal external shape, though it is to be understood, of course, that this shape may vary without departing from the spirit and scope of the invention. The sleeve 26 is again formed with a reduced neck portion 27, receivable in an aperture 28 formed in the plate 25, which aperture, as well as the reduced neck portion 27 of the sleeve, are made circular. Firmly and tightly surrounding the sleeve 26 is an annular layer of rubber 29, which again serves as the driving medium between the sleeve and the plate 25.

In this form of the clutch element, cost of manufacture is further reduced by the elimination of the metal housing employed in the preferred form. In order that the annular layer 29 of rubber may be attached to the plate 25, it is formed at its inner end with a radially extending flange 30 of substantial thickness. This flange is protected and strengthened by an annular ring 31 which is angular in cross-section, so as to extend over the exposed edge and the periphery of the flange. The flange and the ring are, by rivets 32, secured to the plate 25.

In Figs. 6 and 7, there is shown still another modified form of clutch element. Like the element of Figs. 1 to 3, it comprises a disk or plate 35 carrying an annular strip 36 of friction material at its outer periphery, and having mounted centrally of the plate a sleeve 37 which is internally splined to have an axially slidable but non-rotatable engagement with one of the shafts to be coupled by the clutch. In this form, the sleeve 37 is again hexagonal externally, and cooperating with the sleeve to form a driving connection to the plate is a housing 38 which also is hexagonal. This housing, however, instead of being riveted to the plate is formed integrally therewith, as best seen in Fig. 7, thereby reducing the cost of manufacturing the clutch element. Again interposed between the sleeve 37 and the housing 38 is a packing of rubber 39 which is put in under considerable pressure so as to form a firm but yieldable driving connection between the sleeve and the housing capable of withstanding the more or less constant torsional strain which will be placed on the clutch. In order that the heat that may be generated by the clutch, especially when there is any slippage of the cooperating elements, may not through the plate 35 and the housing 38 be transmitted to the rubber 39 and result in deterioration or slippage of the rubber in the housing, a thin layer of asbestos 40 is interposed between the housing 38 and the rubber packing 39. It is believed apparent that this form of the invention, like that shown in Figs. 4 and 5, is more economically manufactured than the preferred form, because the housing 38 is made integral with the plate and thus may be formed along with the remainder of the plate in a single stamping operation, eliminating the cost of a separate housing and the riveting of such housing to the plate. The sleeve 37 is also made without a reduced neck portion at one end, thus further eliminating one operation and thereby contributing to decreased cost of manufacture.

In Figs. 8 and 9, there is shown the most simplified form, and a form which is particularly well adapted for light loads. In this form the element again comprises a plate 42 having a centrally located circular aperture 43. Mounted centrally of the plate is a sleeve 44 which is circular and which has a reduced circular neck portion 45 received in the aperture 43. Enclosing the sleeve is a housing 46 attached to the plate by rivets 47 and also circular the same as the sleeve 44. Interposed between the sleeve and the housing 46 is a packing 48 of rubber which is forced between the sleeve and the housing under pressure so as firmly to engage both the sleeve and the housing despite the fact that both are circular. The rubber packing 48 grips the sleeve and the housing sufficiently tightly, even though there are no projections thereon, to transmit rotation of the sleeve to the housing and plate 42 or vice versa.

I claim as my invention:

1. A clutch element comprising a metal disk having normal thereto a housing-like flange formed integrally therewith at its center, a hub separate from said disk received within said flange and in radially spaced relation thereto, and a packing of rubber composition forced into the annular space between said hub and said flange non-rotatably gripping said hub and non-rotatably engaging said flange to form a driving connection therebetween.

2. A clutch element comprising a metal disk having normal thereto a housing-like flange formed integrally therewith at its center, a hub separate from said disk received within said flange and in radially spaced relation thereto, a packing of rubber composition forced into the annular space between said hub and said flange non-rotatably gripping said hub and non-rotatably engaging said flange to form a driving connection therebetween, and an asbestos lining interposed between said flange and said rubber composition to prevent transmission of heat from said disk to said rubber composition.

3. A clutch element comprising a metal disk having a housing-like flange drawn from the disk at its center to project laterally thereof, a hub separate from said disk received within said flange and in radially spaced relation thereto, and a packing of rubber composition forced into the annular space between said hub and said flange non-rotatably gripping said hub and non-rotatably engaging said flange to form the sole driving connection therebetween.

EDWIN BAGNALL.